United States Patent
Utter

(10) Patent No.: US 10,404,897 B2
(45) Date of Patent: Sep. 3, 2019

(54) METHOD FOR AUTOMATED GENERATION OF REFERENCE COLOR VALUES FOR COLOR CONTROL

(71) Applicant: HEIDELBERGER DRUCKMASCHINEN AG, Heidelberg (DE)

(72) Inventor: Bernd Utter, Schriesheim (DE)

(73) Assignee: Heidelberger Druckmaschinen AG, Heidelberg (DE)

( * ) Notice: Subject to any disclaimer, the term of this patent is extended or adjusted under 35 U.S.C. 154(b) by 0 days.

(21) Appl. No.: 15/422,663

(22) Filed: Feb. 2, 2017

(65) Prior Publication Data

US 2017/0223231 A1 Aug. 3, 2017

(30) Foreign Application Priority Data

Feb. 2, 2016 (DE) ........................ 10 2016 201 543

(51) Int. Cl.
| | |
|---|---|
| *H04N 1/60* | (2006.01) |
| *H04N 1/00* | (2006.01) |
| *H04N 1/40* | (2006.01) |
| *B41F 33/00* | (2006.01) |

(52) U.S. Cl.
CPC ....... *H04N 1/6058* (2013.01); *B41F 33/0045* (2013.01); *H04N 1/00023* (2013.01); *H04N 1/00034* (2013.01); *H04N 1/00058* (2013.01); *H04N 1/00087* (2013.01); *H04N 1/40087* (2013.01); *H04N 1/6033* (2013.01)

(58) Field of Classification Search
None
See application file for complete search history.

(56) References Cited

U.S. PATENT DOCUMENTS

| | | | | |
|---|---|---|---|---|
| 6,018,385 A | * | 1/2000 | Lampersberger ... | B41F 33/0036 356/402 |
| 6,564,714 B2 | * | 5/2003 | Brydges .............. | B41F 33/0045 101/484 |
| 9,365,026 B2 | | 6/2016 | Mueller et al. | |

(Continued)

FOREIGN PATENT DOCUMENTS

| | | |
|---|---|---|
| DE | 10224787 A1 | 12/2002 |
| DE | 102008013744 A1 | 10/2008 |

(Continued)

OTHER PUBLICATIONS

Linus Lehnberg, Ink Key Presetting in Offset Printing Press Using Digital Images of the Plates, May 21, 2002.*

*Primary Examiner* — Barbara D Reinier
(74) *Attorney, Agent, or Firm* — Laurence A. Greenberg; Werner H. Stemer; Ralph E. Locher

(57) ABSTRACT

A method for the automated generation of reference color values for color control purposes in a printing machine by using a computer includes, within a process of setting up the printing machine for a print job, initially carrying out printing operations and using a spectrophotometer to determine coloration values for every process color used in the print job. For every process color that is used in the print job, the computer automatically selects that coloration value of a process color that has the smallest deviation from a color set point that has been established at the beginning of the job and saves this coloration value as a new reference value for this process color.

7 Claims, 3 Drawing Sheets

(56) References Cited

U.S. PATENT DOCUMENTS

| | | | |
|---|---|---|---|
| 2002/0180998 A1 | 12/2002 | Wu | |
| 2003/0156299 A1* | 8/2003 | Martinez | G06K 15/00 358/1.9 |
| 2004/0150848 A1* | 8/2004 | Delang | B41F 33/0036 358/1.9 |
| 2005/0134872 A1* | 6/2005 | Maki | B41F 33/0036 358/1.6 |
| 2008/0236430 A1* | 10/2008 | Elter | B41F 33/0045 101/484 |

FOREIGN PATENT DOCUMENTS

| | | |
|---|---|---|
| DE | 102010031533 A1 | 1/2012 |
| DE | 102014011151 A1 | 2/2015 |

\* cited by examiner

METHOD FOR AUTOMATED GENERATION OF REFERENCE COLOR VALUES FOR COLOR CONTROL

CROSS-REFERENCE TO RELATED APPLICATION

This application claims the priority, under 35 U.S.C. § 119, of German Patent Application DE 10 2016 201 543.5, filed Feb. 2, 2016; the prior application is herewith incorporated by reference in its entirety.

BACKGROUND OF THE INVENTION

Field of the Invention

The present invention relates to a method for an automated generation of reference color values for color control purposes in a machine for processing printing substrates.

The technical field of the invention is the field of reprographic technology.

For every printing process, the color value settings need to be calibrated before a print job is carried out. That applies to all kinds of modern printing processes from traditional lithographic offset printing to digital printing. The calibration of the color settings may be carried out manually by a machine operator or in an automated way by a control unit in the printing press. The calibration principle remains the same irrespective of the manner of implementation. For reasons of efficiency, however, modern printing machines always rely on a computer-based process. Characteristic curves, also known as preset characteristic curves, are used for every process color in the color value calibration process. Those characteristic curves are saved in a digital database and made available to the printing machine control unit, which has access to that database. The color preset characteristic curves are then required for color control purposes in the inking units of the printing machines when a new print job is started. When the print job is started, the result, i.e. the printed color values on the printed substrate, are usually measured and compared to color set points provided for the color measurement system. Based on the deviations between the resultant color values and the actual color values, the control unit or an operator of the control unit recognizes the corresponding deviations and may therefore draw conclusions about the inadequacy of the color preset characteristic curve that has been used. The operator then corrects the color preset characteristic curves and examines whether the resultant printed color values and the color set points match more closely after the changes. That process is referred to as learning the characteristic curve.

An example of such a process of learning a characteristic curve in printing machines is disclosed in German Patent Application DE 10 2008 013 744 A1, corresponding to U.S. Patent Application Publication US 2008/0236430. That process is distinguished in that the acquired measured values are compared with a color set point to be achieved and fluctuations in the acquired measured values are determined. If the fluctuations lie within a defined permissible tolerance band around the color set point, the control unit generates a signal to adapt and store the color preset characteristic curves used for the current print job.

However, that disclosed method of learning characteristic curves directly leads to the realization that the greater the deviation of the color preset characteristic curve that is initially used from the optimum characteristic curve, the more the initial color preset characteristic curve needs to be corrected to achieve the smallest possible deviation from the color set points and the longer the characteristic curve learning process will take, creating a lot of waste products.

In that respect, it is known from the prior art that at the beginning of the characteristic curve learning process for a new ink for which there is not yet a color preset characteristic curve optimized in accordance with the prior art, a so-called default characteristic curve is used. That default characteristic curve is a default characteristic curve that is not adapted to the new ink. In many cases, it is not adapted to the specific printing machine that is used either. Thus, in accordance with the prior art, the use of the default characteristic curve involves the problems of a time-consuming characteristic curve learning process for new printing inks and consequently a longer color control process and more waste.

In practice, there is another problem, namely that the saving of reference color values for the operator is a complex and inconvenient process because it frequently needs to be done manually and separately for every process color. As a result, at the beginning of the printing process, the reference color values are not adapted to the printing conditions, causing the aforementioned problems in terms of too much waste and too much time lost.

In addition, the implementation is very complex. Once the desired coloration has been achieved, the operator needs to remember or write down the ink zones that have the best coloration. Then he or she needs to exit the user interface, open the color archive in the service menu, where he or she needs to create a new set of reference values and reenter the colors, starting with the color of the paper and moving on to the printing inks. In order to master that process, the operator needs extensive and elaborate training. Another problem is that until then, the coloration has changed due to absorption and drying behavior of the ink so that the saved values no longer correspond to the result of the wet printing ink. Thus, the values are of limited use.

During that period of time, the operator can only pay little attention to the printing process (if at all). Thus, he or she would have to run the risk of neglecting the monitoring of the process or else he or she would have to interrupt the production process. In order to avoid both disadvantages, the adaptation of the reference values prior to the start of the printing process using the new ink is frequently omitted, relying on the color control system of the printing press, the control operations of which will then require much more time and produce more waste without the adaptation than if the respective characteristic curve and reference color values had been adapted in a suitable way.

So far, color measurement systems in print shops operate in a way that requires new reference values to be entered manually after a measurement has been taken. For that purpose, the individual colors also need to be defined manually. The operator needs to write down in which ink zone the optimum coloration has been achieved. For that purpose, several ink zones and the coloration values thereof need to be selected and the best result needs to be verified on the basis of a numeric representation.

Another option is to make manual inputs of reference values that do not correspond to the actual printed colors or to import them at a corresponding location. Those values merely represent approximations, which need to be adapted to the coloration properties of the print shop. Pantone and HKS color archives as well as numeric definitions, which are commonly used in packaging printing, are known in the art.

An important aspect is that international standards such as ISO 12647-2 and a color reference communication between industries may only be implemented on the basis of colorimetric values. In accordance with the prior art, however, it is frequently only color density values that are used for color control purposes. With such systems, the saving of meaningful color references on the basis of colorimetric values, as is absolutely required for communication and quality documentation, requires additional effort.

In addition, due to the manual steps of the operation, all systems are highly prone to errors. Subsequent measurements and the addition of a name and a printing substrate have an inherent risk of false entries and of making the set of reference values impossible to retrieve at a later point. In addition, the printing ink changes up to that point, a fact which causes problems in the printing process for later uses. An automated correlation between customer-specific data such as customer name and job number as well as paper parameters and the corresponding color sets in the color archive including the characteristic curve and reference color values would thus increase the efficiency of the configuration process of the machine to a considerable extent.

SUMMARY OF THE INVENTION

It is accordingly an object of the invention to provide a method for automated generation of reference color values for color control in a machine for processing printing substrates, which overcomes the hereinafore-mentioned disadvantages of the heretofore-known methods of this general type and in which no prolonged manual set-up process involving a large amount of waste products is necessary for the machine for processing printing substrates.

With the foregoing and other objects in view there is provided, in accordance with the invention, a method for the automated generation of reference color values for color control purposes in a printing machine by using a computer, wherein during the process of setting up the machine for a print job, first print runs are carried out and coloration values are measured by using a spectrophotometer for every process color used in the print job, and for every used process color, the computer automatically selects the coloration value that has the smallest deviation from a color set point that has been established at the beginning of the job and saves this coloration value as a new reference value for this process color.

The core of the method of the invention is that standard reference color values are used when the printing machine is set up for a printing process using a new ink that has not been used before. The standard reference values result from the standard calibration characteristic curve for the new ink. The coloration values for this ink that have been established by a spectrophotometer during the start-up phase are then compared with the color set points or target values known from the prepress stage. Those coloration values that are closest to the color set points known from prepress stage are adopted. The adopted coloration values are then considered to be the new reference value for this ink to be used for (potential closed-loop) color control purposes.

Advantageous and thus preferred further developments of the method will become apparent from the associated dependent claims and from the description together with the associated drawings.

A preferred further development of the method of the invention is that in addition to the coloration values, the color density values of the process colors are established by the spectrophotometer or, alternatively, by a densitometer or a combination measuring head including a spectrophotometer and a densitometer.

Since the color density values of the process colors are required for optimum color control, color density values are used in addition to the colorimetric values such as CIEL*a*b. The establishment of the color density values may likewise be carried out by the spectrophotometer. Alternatively, if the spectrophotometer cannot establish color density values, the use of a densitometer or of a combination measuring head including a spectrophotometer and a densitometer is possible.

Another preferred further development of the method of the invention is that the selected reference color values are formed of the CIE Lab values of the printing substrate, of the CIE Lab values of the respective printing inks being used, and the color density values for the respective printing inks being used.

In addition to the coloration values of the printing ink being used, a complete pre-setting of the printing machine also needs to factor in the coloration values of the respective printing substrate being used, because the resultant coloration value may logically be formed only of the two coloration values of the ink and the printing substrate. The aforementioned color density values are likewise part of the reference color values and of the color set to be saved. In this context, a color set is understood to be a combination of reference values for attaining a desired coloration in the printing process.

An additional preferred further development of the method of the invention is that the printing machine is a sheet-fed lithographic offset printing press.

A main field of application for the method of the invention is the field of lithographic offset printing presses, in particular in sheet-fed lithographic offset printing presses.

An added preferred further development of the method of the invention is that the spectrophotometer establishes the coloration and color density values for every process color in every ink zone and that for this process color, the computer selects the ink zone having measured values which have the smallest deviation from the color set points defined at the beginning of the job.

The coloration and color density values that have been measured by using a spectrophotometer, densitometer, or combination measuring head are measured several times for every image, namely a data set is established for every ink zone and subsequently, the coloration value of the ink zone that is closest to the color set point is accepted for the new printing ink.

An additional preferred further development of the method of the invention is that through the use of a display device, the computer displays all ink zones and the corresponding reference color values for all process colors being used to an operator, optically indicating the selected ink zones to allow the operator to manually select a different ink zone for all process colors by using an input device and/or to manually modify the reference color value established for the selected ink zone.

The coloration values established for every ink zone are displayed to the operator on a display device in a suitably prepared way. The coloration values of the ink zones that have been automatically established as the ones closest to the color set points are optically marked. The operator may then decide whether to accept the coloration values that have been established automatically or whether to use coloration values of different ink zones. The operator may even change coloration values completely by numerically inputting completely new coloration values. It is likewise conceivable for this process step to be optional if the operator trusts the automatically established coloration values by experience.

Another preferred further development of the method of the invention is that in addition to the ink zones, job data for the current print job such as customer name, job number, used paper type, and paper class are displayed and the generated reference color values are saved under the customer's name or job number either locally on the computer or in a database.

For a more efficient administration and processing of the method, the job data for the current print job as well as the type of paper being used and paper class are displayed to the operator and the generated reference color values are saved under the customer's name or under the job number. This may be done locally on the control unit or in a database available to the control unit. In the latter case the generated reference color value would be available to other color measurement systems of the same type.

An added preferred further development of the method of the invention is that in a first step, the computer accesses standard reference color values for the used process colors of a color set saved in a database and uses them as a basis for generating the new reference color values.

In order to be able to make a first print for setting up the press, default values for the reference color values, namely a default characteristic curve, need to be used. They need to be accessed in the database, and a standard color set always needs to be present locally on the computer. Alternatively, the default values may of course come from a remote color archive.

An additional preferred further development of the method of the invention is that the coloration and color density values that have been established for the creation of the reference values for every process color used in the print job are measured by the same spectrophotometer, densitometer, or combination measuring head of the same color measurement system at the same instant of the printing process as during the actual color control for processing the print job.

An advantage of using the color measuring system, in this case preferably a spectrophotometer, that is also used for the actual color control process is that no additional measuring devices such as hand-held spectrophotometers or hand-held densitometers need to be used. In addition, it means that at the measuring instant, the process color is precisely in the state (e.g. in terms of coloration values) in which all future measurements and control operations in the course of the actual color control process are carried out. This is not the case if the process colors are remeasured at a later point and have already diffused into the paper or dried oxidatively.

Other features which are considered as characteristic for the invention are set forth in the appended claims.

Although the invention is illustrated and described herein as embodied in a method for automated generation of reference color values for color control, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings. The method of the invention as well as further developments of the method that are advantageous in functional terms will be explained in more detail below with reference to the associated drawings and based on at least one preferred exemplary embodiment.

DETAILED DESCRIPTION OF THE INVENTION

Figure 2:
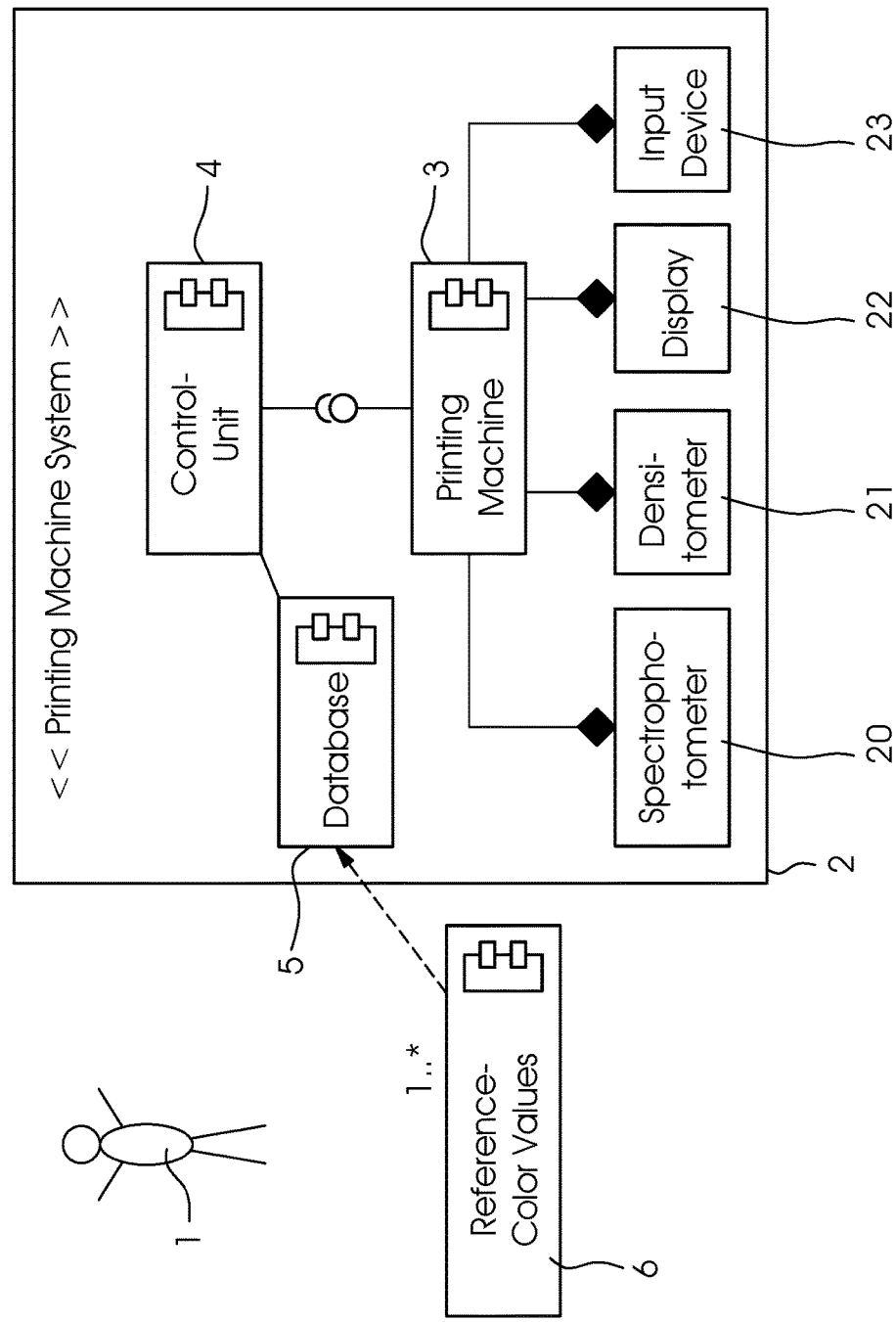
FIG. 2 is a block diagram of a printing machine system in which the method of the invention is used.

Referring now in detail to the figures of the drawings, in which identical reference symbols identify identical elements, and first, particularly, to FIG. 2 thereof, it is seen that the method of the invention in its preferred embodiment is used in a printing machine system 2 which is shown in a block diagram. The system includes a printing machine 3 that is to be calibrated for a pending print job. The printing machine 3 is monitored by a control unit 4 that has access to a database 5 in which color sets 6 of the inks that have been used so far are saved. The printing machine 3 also includes a spectrophotometer 20, a densitometer 21, a display 22 and an input device 23.

In order for the desired set-up time optimization to become effective, the printing machine 3 needs to be set up in an optimum way and the target colorations adapted to the ink/paper combination that will be used absolutely need to be available in the color measuring system as reference values 6 in the form of spectrums, CIEL*a*b values 16, and densities 18. In practice, it is precisely these data which are missing because an operator 1 may need many training sessions to make correct inputs and may find inputting the data too complex, difficult to understand, and not transparent. As a result, attaining the desired coloration result 15 on the printed sheet still takes too much time and creates too much waste.

Figure 3:
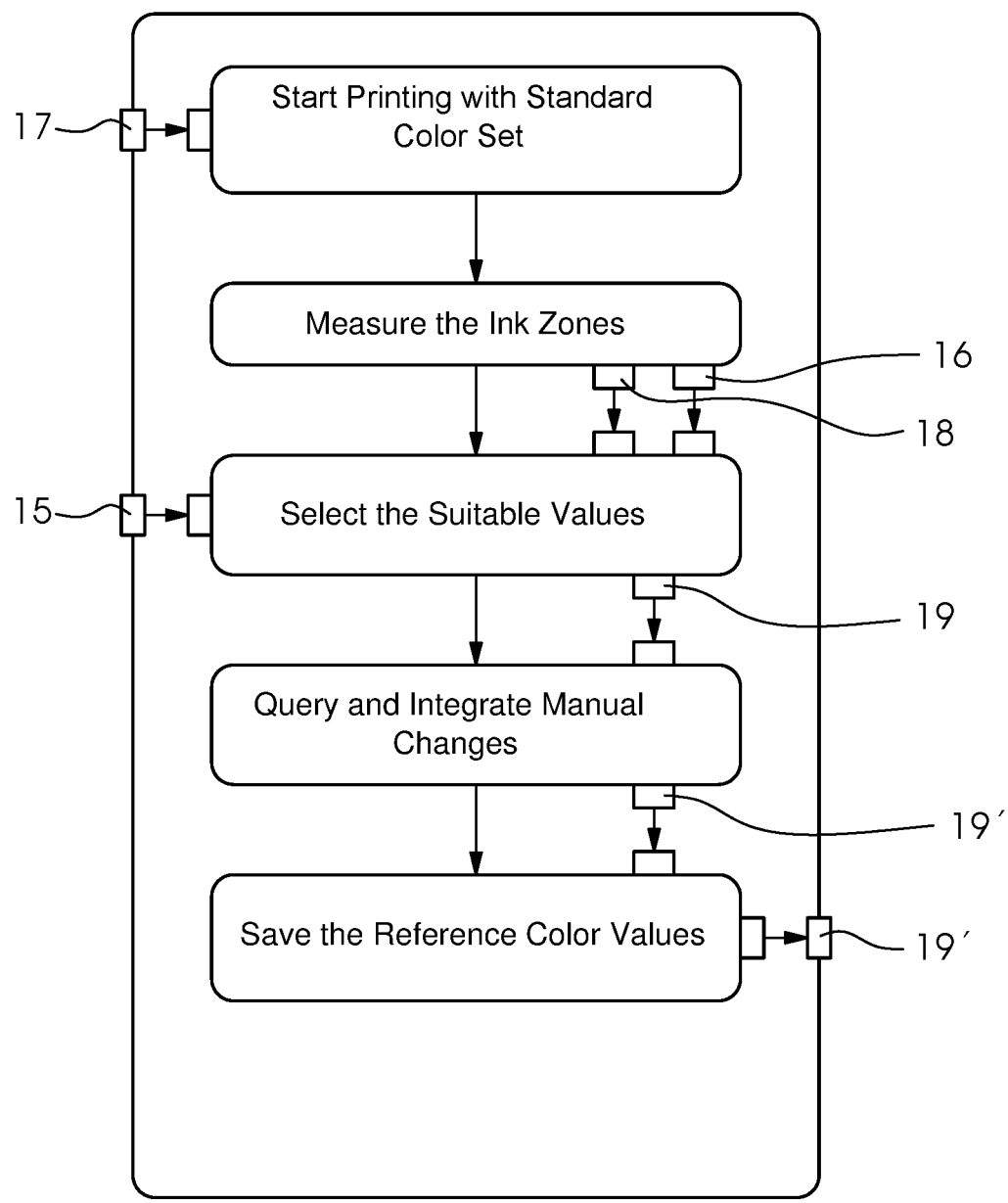
FIG. 3 is a schematic flow chart of the method of the invention.

Thus, it is strongly recommended that the operator 1 be given a chance to save optimum colorations that have been attained before in such a way as to make them readily and easily retrievable in an uncomplicated way not only for this job but for all further print jobs that have an identical coloration target. The method of the invention provides a way to do this. A diagrammatic flow chart of the method of the invention is shown in FIG. 3.

In a first step, the operator 1 will always need a standard reference color value as a starting point for printing. The reference color value may be taken from a spot color archive or from a so-called standard color set 17. Up to this point, the method corresponds to the prior art. In accordance with the prior art, once the desired reference coloration has been attained, the operator 1 would manually check whether or not the attained reference coloration 16, 18 matches the desired result 15. If this is not the case, the operator would continue to make manual changes until the print result looks good or matches a pre-defined sample. In general, this is done by modifying the target values in the color settings of the printing machine 3.

Figure 1:
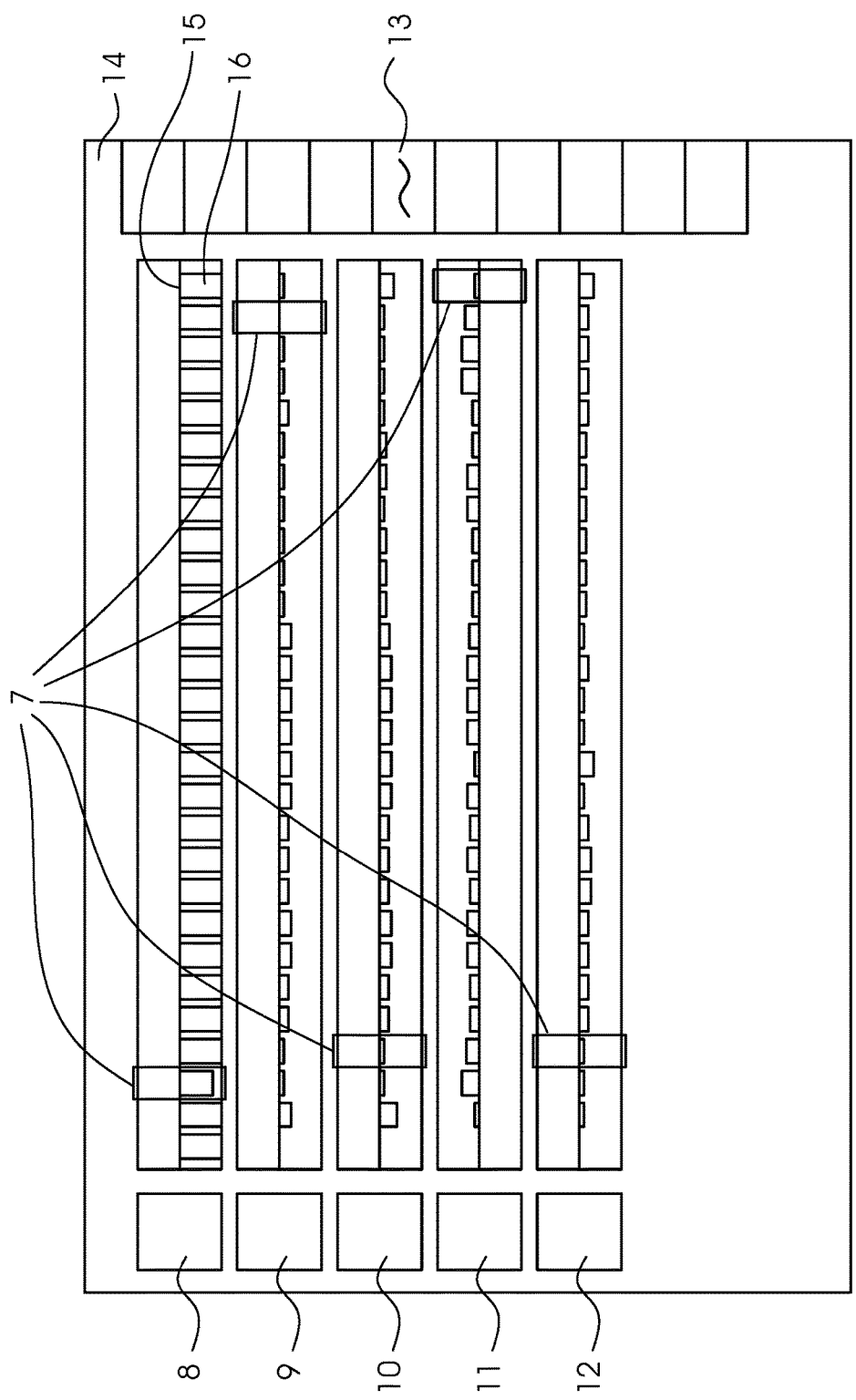
FIG. 1 is a diagrammatic plan view of a GUI (Graphical User Interface) overview of generated reference color values.

FIG. 1 illustrates a preferred embodiment in the form of a graphical user interface 14 of the control unit 4 for carrying out the method of the invention.

In this case, the process is different. Once the printing operation has started, reference color values 16 for all ink zones are measured by using a spectrophotometer. The reference color values 16 are then displayed to the operator 1 in the graphical user interface 14 on a display of the control unit of the printing machine 3. In the preferred embodiment shown in FIG. 1, these are the process colors orange 8, black 9, cyan 10, magenta 11, and yellow 12. The coloration overview is always geared to the target coloration 15 and indicates when the latter is attained. The control unit 4 then automatically selects a value 7 of the ink zone that is closest to the target coloration 15, simultaneously marking the selected values 7 in the graphical user interface. In the preferred embodiment shown in FIG. 1, this is illustrated for the reference color values 7. Additionally, however, the process is carried out in a similar way for the measured color density values 18.

Once the selected reference color values and reference density values have been displayed to the operator 1, the latter may make manual changes 19'. This may be desirable, for instance, if no measured reference color value of a specific ink zone 16 comes close to the target coloration 15. In this case, the operator 1 needs to make manual changes. The measured reference color values 16 for the process color orange 8 are an example of this because all of the measured reference color values 16 for all ink zones greatly deviate from the color set points 15. If the operator 1 pushes the "modify" button 13, he or she may either click on the reference color value 16 of a different ink zone in the overview or he or she may input values 16 manually. If the density values 18 are changed, the reference color values 16 need to change in a corresponding way and vice versa. The operator may likewise change the names. Then the color set 19' is saved and is then available for all measuring systems. The selected reference color values 7 are then saved as a color set 6 in a modified version 19' or in a non-modified version 19, respectively. Then they are used for the print job and are additionally saved in the database 5 for a future use of the same process color.

For this purpose, the button "save target values" 13 is to be provided directly on the user interface 14 for all measuring systems.

In addition, the customer's name and paper being used are automatically extracted from the job data and added to an overview. In this way, the color set 6 is unequivocally retrievable in the database 5 and associated with the customer. If a different paper than the one that has been saved is used at a later point, the operator 1 will know immediately that he or she may have to create a new color set 6.

If no customer name and/or paper type was given or is available, the job number and paper class are indicated. The font type or color is changed in order to highlight information.

In addition to its simplicity, a great advantage of this method is that at the instant of the measurement, the process color is in precisely the same state in which all future measurements and control operations of the regular color control system will be carried out. This is not the case in the prior art where process colors are remeasured at a later point and have already diffused into the paper or dried oxidatively.

The following is a summary list of reference numerals and the corresponding structure used in the above description of the invention:
1 operator
2 printing machine system
3 printing machine
4 control unit
5 database
6 color set saved in a database including reference color values and reference density values
7 selected reference color value
8 used process color "orange"
9 used process color "black"
10 used process color "cyan"
11 used process color "magenta"
12 used process color "yellow"
13 button for saving the selected reference color values
14 graphical user interface
15 color set point
16 measured reference color value
17 standard color set
18 measured color density value
19 color set including selected reference color values and reference density values
19 color set including manually modified reference color values and reference density values

The invention claimed is:

1. A method for the automated generation of reference color values for color control in a printing machine by using a computer, the method comprising the following steps:
within a process of setting up the printing machine for a print job, initially carrying out printing operations and using a spectrophotometer and a densitometer or a combination measuring head including a spectrophotometer and a densitometer to determine coloration values and color density values for every process color in every ink zone used in the print job;
using the spectrophotometer and the densitometer or the combination measuring head to determine the coloration values and color density values for every process color in every ink zone and subsequently using the computer to select an ink zone having measured values with a smallest deviation from the color setpoint having been set at a beginning of the print job for the process color;
using the computer to save the ink zone with the measured coloration values and color density values with the smallest deviation from the color setpoint having been set at the beginning of a print job for the process color as a new reference value for the process color; and
using the coloration value and color density value from the saved ink zone in an execution of the print job.

2. The method according to claim 1, which further comprises saving the selected reference color values as CIE Lab values of respective process colors being used, and additionally saving CIE Lab values of the printing substrate as well as color density values for respective process colors being used as a color set.

3. The method according to claim 1, wherein the printing machine is a sheet-fed lithographic offset printing press.

4. The method according to claim 1, which further comprises:
using the computer to display to an operator on a display device all ink zones with the corresponding reference color value and the corresponding color density value for all process colors being used;
optically marking the selected ink zones; and
using an input device to provide the operator with an option of at least one of manually selecting a different ink zone for all process colors being used or manually modifying the reference color value and the color density value established for the selected ink zone.

5. The method according to claim 4, which further comprises:

displaying, in addition to the ink zones, job data for a current print job including at least one of a customer's name, a job number, a paper type being used and a paper class; and saving the generated color sets with the determined reference color value and the color density value under the customer's name or job number locally on the computer or in a database.

6. The method according to claim 1, which further comprises in a first step, using the computer to download standard reference color values for the process colors being used from a color set saved in a database and using the computer to generate the new reference color values and color density values based thereon.

7. The method according to claim 1, which further comprises, for every process color used in the print job, using the spectrophotometer, densitometer, or combination measuring head of a color system for the coloration values and color density values determined for the generation of the reference values and in the printing process as the established color values during the actual color control process for processing the print job.

* * * * *